United States Patent

Chen et al.

[15] 3,678,820

[45] July 25, 1972

[54] OPTICAL SYSTEM FOR PROJECTION RECORDING APPARATUS

[72] Inventors: Philip L. Chen, Penfield, N.Y.; Louis F. Paradysz, East Randolph, Vt.

[73] Assignee: Xerox Corporation, Stamford, Conn.

[22] Filed: Nov. 19, 1970

[21] Appl. No.: 91,156

Related U.S. Application Data

[63] Continuation-in-part of Ser. No. 791,044, Jan. 14, 1969, abandoned.

[52] U.S. Cl. ..........95/4.5

[51] Int. Cl. ..........B41b 21/22

[58] Field of Search ..........95/4.5

[56] References Cited

UNITED STATES PATENTS 3,273,475 9/1966 Moyroud et al. ..........95/4.5

1,893,158 1/1933 Chireix et al ..........95/4.5 X

*Primary Examiner*—John M. Horan

*Attorney*—James J. Ralabate, John E. Beck and Benjamin B. Sklar

[57] ABSTRACT

An alphanumeric recording system wherein a character disc having transparent character images thereon is rotated through an exposure zone so that selected characters may be projected by the energization of a flash lamp. The projected image is collimated and directed to a recording zone through which move lens-mirror units at a constant speed to intercept the projected image and focus it onto a photoreceptive recording medium. The character disc rotates at a rate such that with the slits therein associated with respective characters inter-character spacing is assured. Dead time in the recording process is eliminated by the use of the collimated projected character image and plural interception of that image.

3 Claims, 6 Drawing Figures

INVENTORS
PHILIP L. CHEN
LOUIS F. PARADYSZ
BY
John E. Beck
ATTORNEY

OPTICAL SYSTEM FOR PROJECTION RECORDING APPARATUS

This application is a continuation-in-part of application, Ser. No. 791,044, filed Jan. 14, 1969, now abandoned.

This invention relates generally to information recording and specifically to information recording utilizing optical projection techniques.

Prior art recorders utilizing optical projection techniques have not satisfied the industry needs relating to quality, versatility and high speed performance. Many prior art apparatus employ a stepped or incrementally driven drive for an appropriate optical system which is used to scan a recording medium in a line-by-line fashion. Such an approach is costly in terms of both money and time or speed. In addition, such prior art recorders inherently have an inordinate amount of dead time between the end of one line of alphanumeric information and the beginning of the next line of alphanumeric information.

It is, therefore, an object of the present invention to provide improved recording utilizing optical projection at a substantially high rate of speed.

It is another object of the present invention to improve optical projection techniques used in recording lines of information.

A further object of the present invention is to provide an improved optical projection system for a recorder wherein dead time between the recording of successive lines of information is eliminated.

These objects and other objects which may become apparent may be appreciated more readily upon reading the following detailed description in conjunction with the attached drawings wherein.

Reference will now be made in detail to the mechanical structures illustrated in FIGS. 1, 2 and 3 which depict in detail the significant portions of an alphanumeric character recorder in accordance with the principles of the present invention.

Figure 1:
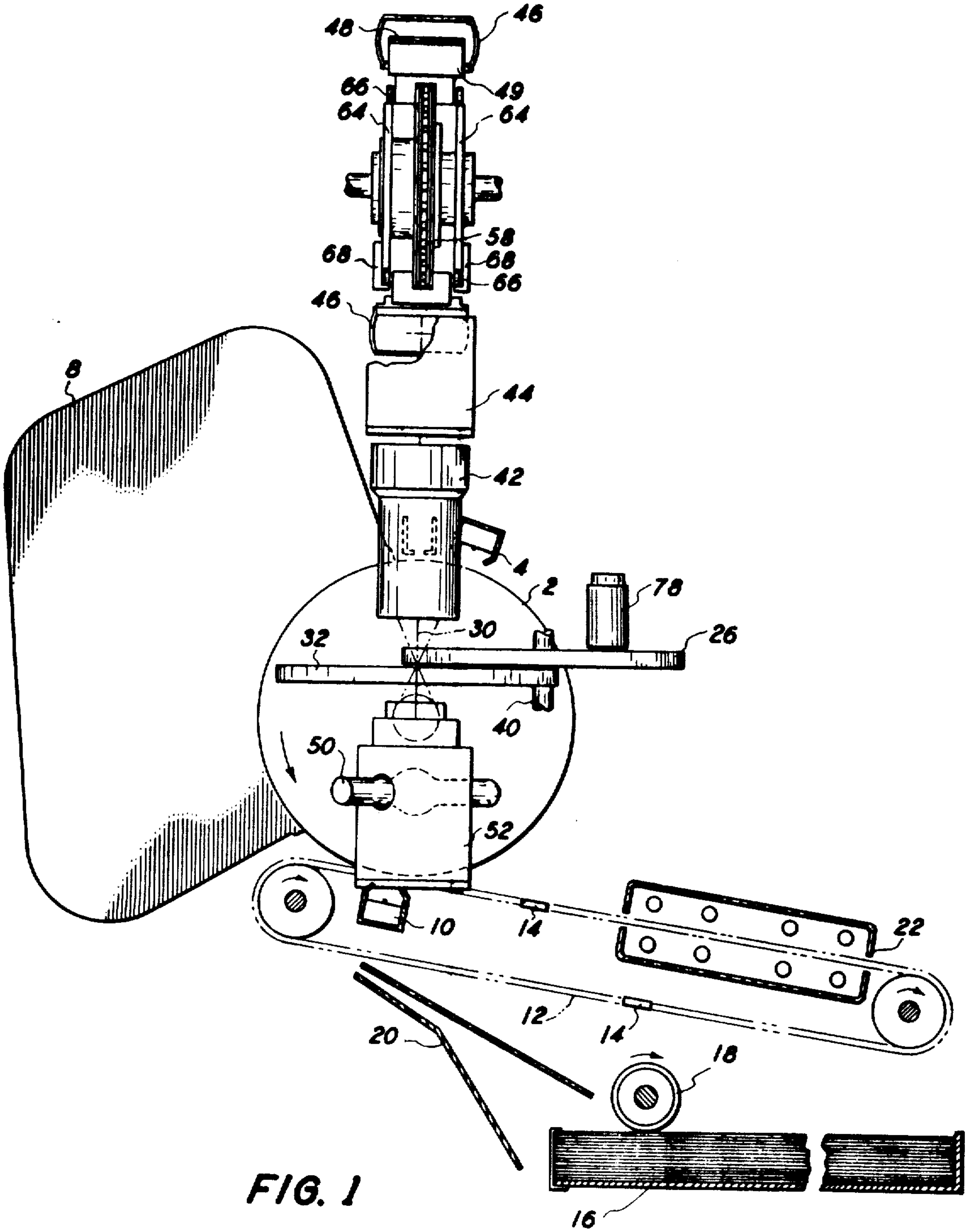
FIG. 1 is a side view of an apparatus representing the present invention.
Figure 2:
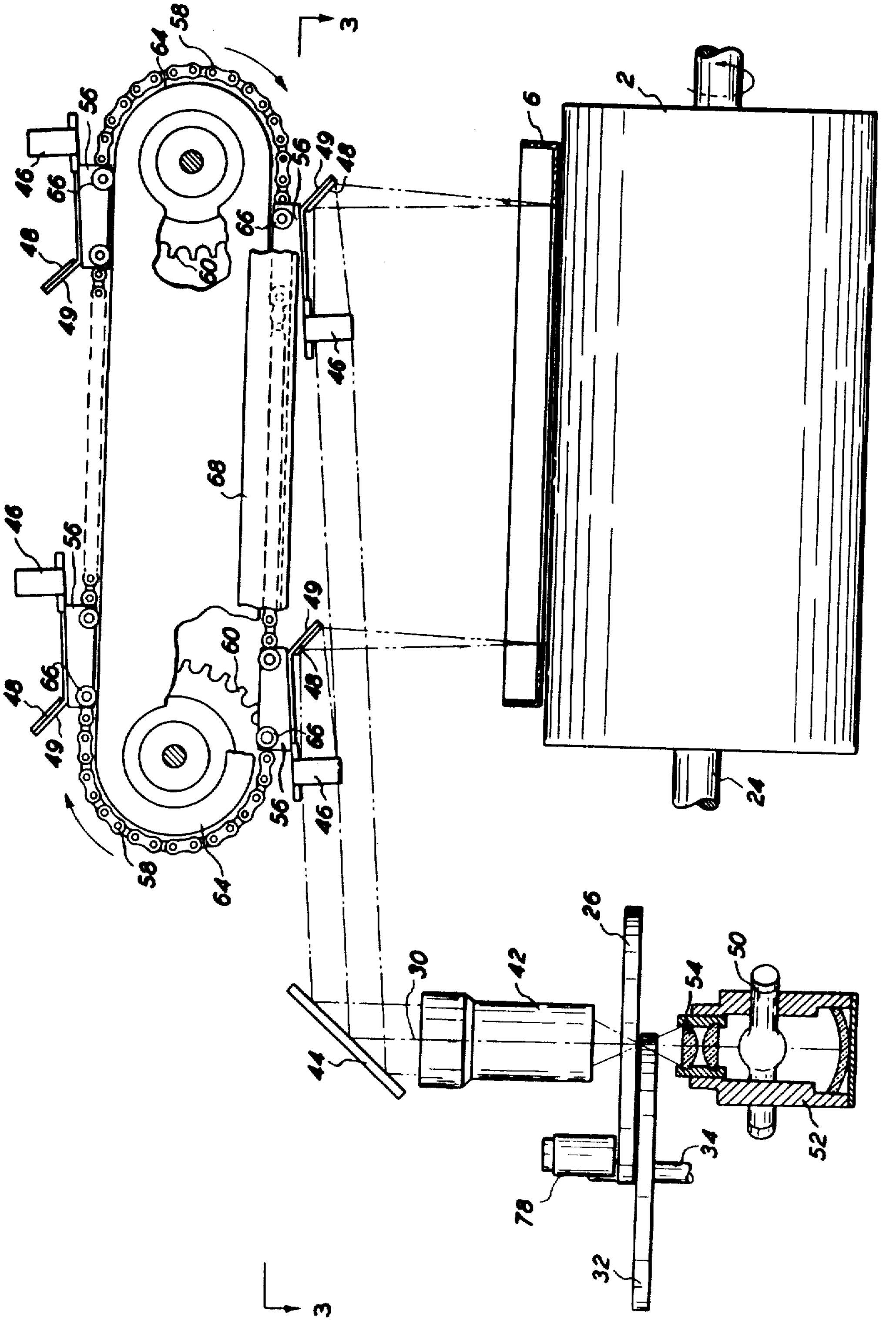
FIG. 2 is a front view of the apparatus shown in FIG. 1 with some parts broken away.
Figure 3:
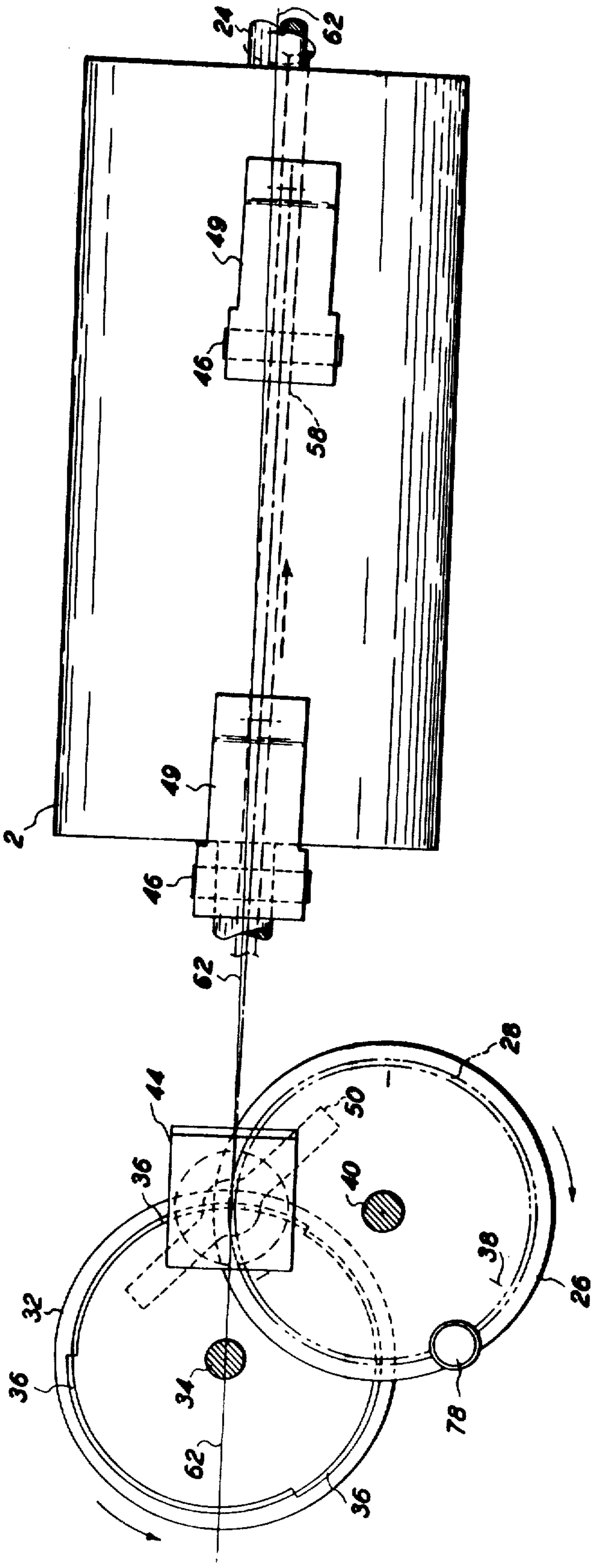
FIG. 3 is a top cross-sectional view of FIG. 2 taken along section lines 3—3.

FIG. 1 shows in somewhat more detail than FIGS. 2 and 3 exemplary xerographic process stations which are conventional in nature and actually form no part of the present invention. However, they are illustrated to provide a point of reference for the present invention in a practical environment. Not all of the details of the xerographic process have been illustrated but sufficient details of those stations illustrated and other desirable stations not illustrated may be obtained from U.S. Pat. No. 3,187,651, which issued to Eichorn et al. on June 8, 1965, assigned to the same assignee as the present application. Basically, a conventional xerographic drum 2 is shown to rotate in the direction indicated by the arrow to pass successive portions under the influence of a pre-exposure corotron 4 and to an exposure station which is represented by the slit mask 6 where the previously charged xerographic drum is selectively discharged in accordance with the intensity of the image at the exposure station. The latent electrostatic image thereby produced may then be conventionally developed with electroscopic marking particles using a suitable developing apparatus such as a cascade developer represented by the housing 8.

The developed latent image is then moved to a transfer station where a transfer corotron 10 transfers the electroscopic marking particles onto a copy sheet which is held on a copy sheet conveyor 12 by means of a suitable gripper mechanism 14 shown in more detail in the aforementioned patent. The copy sheet can originate from an appropriate copy sheet tray 16 under the influence of a feed-out roller 18 and paper guides 20. After transfer a conventional radiant fuser 22 may be employed to permanently affix the transferred image onto the copy sheet.

Referring now specifically to the mechanical structure with particular reference to FIG. 2 which best depicts this structure which is partially shown in FIGS. 1 and 3, the xerographic drum 2 which is rotated by motive power applied to its shaft 24 provides the final receptor of optical information projected onto it via slit mask 6.

As noted before, the xerographic aspects of the present disclosure do not constitute a portion of the inventive concept herein disclosed. For example, any photoresponsive medium may be used to receive and record the optical projections. Therefore, the xerographic drum may be replaced by a suitable photographic medium or any other light responsive medium. It goes without saying that in certain situations depending upon the type of recording medium utilized a drum configuration is not necessarily desirable and a flat plate adapted for movement could also be employed.

The source of the optical projections which are received by the xerographic drum 2 originate from a pattern disc 26 which is driven rotatively so as to pass an annular pattern area 28 successively through an exposure zone. As will be described hereinafter, this area 28 is composed of sets of transparent light modulating patterns capable of optical projection. The exposure zone is aligned with the center line of the image path designated in FIG. 2 by reference numeral 30. Other elements further define this exposure zone such as the optical field stop disc 32 which is driven about its axis represented by a drive shaft 34 as shown in FIG. 2. As shown best in FIG. 3 the optical field stop disc 32 is generally opaque to a particular illumination utilized in the recording apparatus and has transparent portions 36 thereon which correspond to segments of a spiral. Each segment 36 has a radius from the center of the disc 32 which corresponds to the following equation:

$$R = R_o + KO$$

where $R$ is the radius of the segment measured from the center of the disc 32,, $R_o$ is the shortest radius of the segment as measured from the center of disc 32, $K$ is a constant and $O$ is the angle subtended by $R$ and $R_o$. As shown in FIG. 3, disc 32 has three such segments 36, each of which correspond to a set of light modulating patterns on disc 26 which are used in the recording operation. In a particular example of this disclosure, each set includes alphanumeric characters comprising two alphabets, upper case and lower case.

As will be seen again in FIG. 3 referring to the disc 26, there are three transparent slits 38 in an otherwise opaque disc with, of course, the exception of the character area 28 and other slits. These slits, as will be seen in more detail hereinafter, designate the beginning and end of an alphanumeric character set on the disc 26. The angle subtended by any one of the segments 36 on the optical field stop disc 32 is equal to 120°. Therefore, as shown in FIG. 3 where the character area 28 of disc 26 and any portion of a segment 36 of disc 32 intersect proximate to the center line 30 of the image path, the exposure zone will be defined. It can be readily understood that although the character area 28 is concentric about the axis and drive shaft 40 of character disc 26, the exposure zone previously defined will vary about the center line 30 of the image path as a function of the aforementioned equation since the spiral segments 36 will vary in their distance from the center of disc 32. This will be seen in greater detail hereinafter in connection with discussion of FIGS. 4 and 5. It is sufficient at this time to describe the exposure zone as being the intersection of any of the segments 36 and the character area 28 of disc 26 at or near the center line 30 of the image path.

Both disc 32 and 26 may be formed by etching photographic emulsion which is adhered to one side of a lightweight normally transparent disc-shaped material such as plexiglass.

The emulsion side of the discs 26 and 32 face each other and are very closely spaced so as to permit the segments 36 and the character area 28 to be as proximate to the object plane of the projection optical system as is possible.

This projection optical system is represented by a collimating optical assembly generally designated by reference numeral 42 which acts to collect the light passing through the selected portion of the character disc 26 and collimate it for reflection by a main mirror 44. The light from main mirror 44 is then acted upon by two identical lenses 46. These may be achromatic doublets of conventional design and as seen in FIGS. 1 and 3 are substantially rectangular in area. They serve to focus via mirrors 48 the light reflected by mirror 44 onto the image plane represented by the surface of xerographic drum 2 exposed through slit mask 6. As is shown in FIG. 2, a support member 49 holds the lens 46 and the mirror 48 in a fixed relationship relative to each other to insure proper optical alignment throughout the operation of the apparatus.

The source of the light which has been described as passing through the optical system is generated by a suitable flash lamp 50 which may suitably be a xenon lamp housed in a conventional light box 52 so as to permit light to exit through an optical assembly 54 and into the exposure zone previously referred to.

The description of the optical arrangement can be summarized by saying that a character in the pattern area of disc 26 is illuminated and this object character in the character plane is imaged at infinity by the collimating action of assembly 42. The main mirror 44 reflects this collimated light to lens 46 which images that character via mirror 48 onto the image plane at the surface of the drum 2 or other photoreceptor.

Referring now specifically to FIGS. 1 and 2, the manner in which the optical projections from the character disc 26 are spacially recorded on the surface of drum 2 will be described. As noted hereinabove, lens 46 and mirror 48 are formed into an integral unit by an appropriate support member 49. This support member is, in addition, attached to a carriage 56 which is fixed to a flexible, endless drive member 58, which may be a chain as illustrated in the drawings. The chain engages two sprocket wheels 60, one of which may be driven by a suitable source of motive power not shown to move the chain 58 through its particular path as shown best in FIG. 2. A plurality of carriages 56 are shown attached to the chain 58 and, as will be seen hereinafter this number of such carriages and associated optical units can not be less than two and may be larger.

FIG. 2 depicts two of these units in the optical path formed by the reflected light from mirror 44 which in part is directed by either one of the units onto the surface of drum 2 at the beginning or end of the slit in the mask 6. The movement of the chain viewing FIG. 2 is in a clockwise direction as indicated by the arrows. Therefore, the lens-mirror assembly on carriage 56 on the left can be considered as having completed the projection of a line of alphanumeric information and the identical assembly on the right can be considered as initiating the next line of recorded information. Because of the finite speed at which chain 58 drives these lens-mirror assemblies along the axis of drum 2, it is necessary in order to achieve the line recordings which are substantially perpendicular to the edges of drum 2 to skew the plane of the chain 58 with respect to the drum's axis which is represented in FIG. 3 by reference numeral 62. The amount of skew is a function of the chain's speed and the linear velocity of the drum. In this way, in the final copy the horizontal lines of alphanumeric information will be equally spaced and substantially perpendicular to the side edges of the copy sheet.

Because of the high speed capabilities of the recording apparatus permitted by the present invention the speed at which the chain 58 is driven may cause certain vibrations which adversely affect the quality of the final copy. In order to minimize these effects, a stabilizing plate 64 is employed upon the edge of which in effect rides carriages 56 by way of wheels 66 which are best shown in FIGS. 1 and 2. These wheels are rotatively mounted on the same pins which attach carriage 56 to the chain 58. Because of the tension in the chain 58, the wheels 66 of the carriages 56 maintain continuous contact with the edge of the stabilizing plate 64.

In the recording zone of the apparatus defined as shown in FIG. 2 by that space between the mirrors 48 of the two lens-mirror units shown providing exposure of the drum 2, additional stabilizing flanges 68 are employed to provide positive restraint on both the upper and lower portions of the periphery of wheels 66. As seen better in FIG. 1 flanges 68 are attached appropriately to respective ones of the stabilizing plates 64. This insures the very minimum of vibration in the recording zone by chain 58 and carriages 56 thereby providing little, if any, blur in the image projected on the surface of drum 2. It is recognized that the stabilizing provisions are not necessary to the operation of the system but only enhance the quality of the resultant recording.

At this point, the operation of the apparatus as depicted in the drawings may be summarized as follows. Through appropriate logic control circuitry yet to be described, input signals representative of alphanumeric information are received by the recording apparatus and decoded so as to indicate what particular alphanumeric character is to be projected and recorded onto the surface of xerographic drum 2 at any instant of time. This indication is compared with the ever changing status of the character disc in the exposure zone so that when the selected character is properly positioned at this zone, the flash lamp 50 is energized. The image of the selected character is then projected through the optical system via optical assembly 42, mirror 44, lens 46, and mirror 48 to selectively discharge the xerographic drum in accordance with the optical information. During this time one of the lens-mirror assemblies on carriage 56 is moving from right to left as seen in FIGS. 2 and 3 so that a series or sequence of alphanumeric characters may be recorded in a line substantially parallel with the axis of drum 2.

Due to the speeds involved, it is necessary to provide proper and uniform spacing between adjacent alphanumeric characters appearing in a word, for example. Since the motion of the driving chain 58 is at a constant velocity in contradistinction to being incrementally stepped, it is possible when using prior art techniques that two alphanumeric symbols separated by some distance on the character disc 26 may be recorded sequentially with a spacing which would be different from the spacing between two projected characters which occupy adjacent positions on the disc 26. Expressed differently, since the disc 26 is continuously rotating at a uniform speed, the time which elapses between the character A, upper case, being at the exposure zone and the lower case Z being at the recording zone is considerably greater than the time elapsing between the upper case A and B sequentially being presented to the exposure zone. Since the carriages 56 are moving constantly, this difference in time means the lens-mirror unit moves a different amount.

As will be seen in more detail in the description of the electronic circuitry which controls the recording process, the apparatus of the present invention is designed to project one alphanumeric character per set of alphanumeric characters. Therefore, the spacing problem is involved each time it is desired to sequentially record any two characters.

Figure 5:
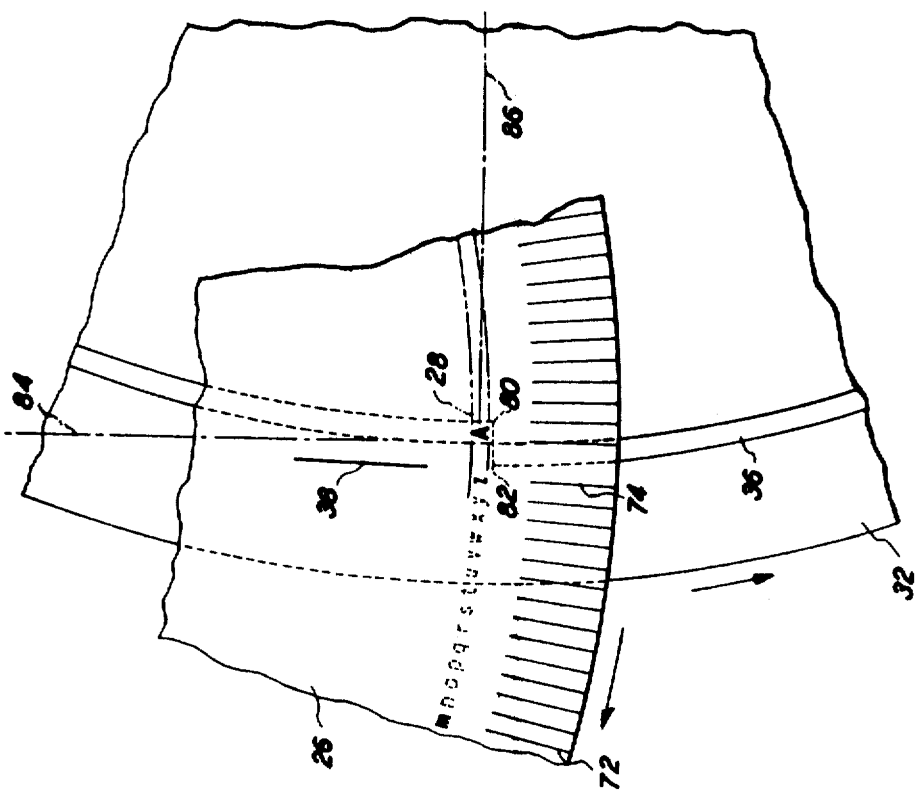
FIGS. 4 and 5 illustrate sequential relationships between a character disc and an optical field stop disc during operation of the apparatus illustrated in the above figures.
Figure 4:
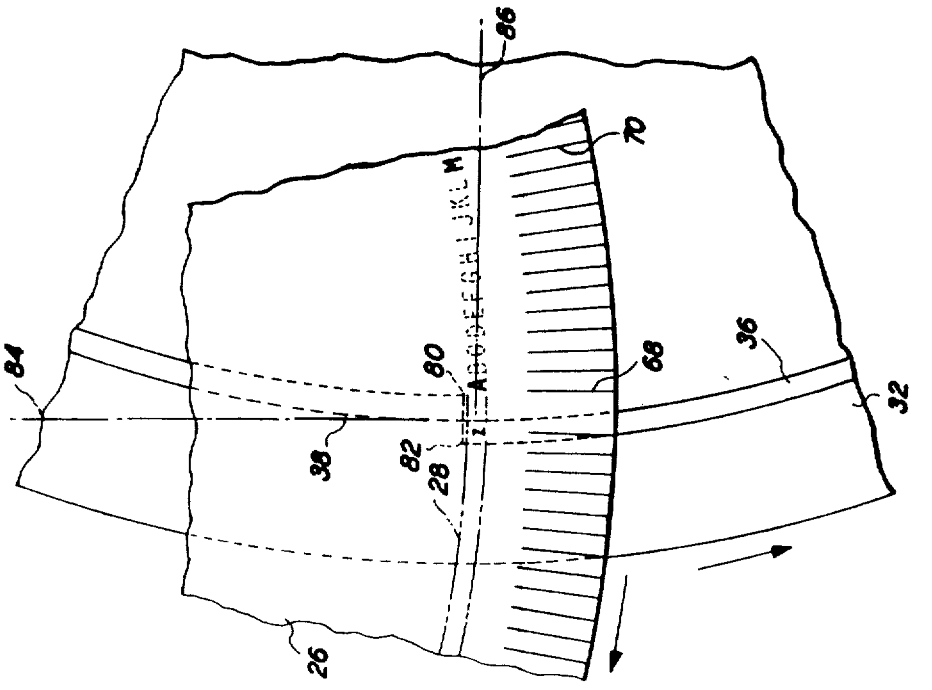

However, the present invention solves this problem by utilizing character slits shown best in FIGS. 4 and 5 to which reference is now made. As shown there, each slit is on a radian of disc 26 and extends from the periphery of disc 26 a short distance toward the center of the disc. Each alphanumeric character in the character area 28 is centered in a character space which is uniform in size for all characters. Therefore, the centers of adjacent characters are uniformly spaced from each other. The character slits vary in their alignment with a particular character space. As will be noted the spacing of adjacent character slits is uniform. However, the spacing or the alignment between a particular character slit and its respective character space varies depending upon the position of the respective character in the character space in its respective set. This can be seen upon close examination of FIGS. 4 and 5.

Character slit 69 associated with the space occupied by the upper case character A is located 0.5/52 of a character space to the right of the left-most portion of that character space. Examining the character slit 70 associated with the space occupied by the upper case character M it can be seen that this slit is removed from the left-most portion of that space by slightly less than one-fourth of the width of that character space. In FIG. 5 the character slit 72 associated with the lower case character M is shown to be removed approximately three-fourths the width of a character space from the left-most side of the character space occupied by this character. Turning then to the lower case character Z, character slit 74 associated with that character is located 0.5/52 of a character space to the left of the right-most side of that space. The character slits for those alphanumeric characters intermediate the characters previously referred to have associated with them similar slits which are positioned uniformly from the preceding slit.

The changing relationship of successive character slits with successive characters is easily appreciated when it is considered that each alphanumeric character both upper and lower case is centered in a uniform sized character space. The character slits as noted previously are uniformly spaced from adjacent slits but the spacing of these slits is somewhat greater than the spacing between the centers of adjacent character spaces. Therefore, in the example used in this description wherein each alphanumeric character set contains 52 symbols or characters plus one blank space, and the center of adjacent characters are spaced apart by a unit designated by the constant Q, the character slit spacing between adjacent slits can be represented by Q/52 plus Q. Therefore, referring to FIGS. 4 and 5, it can be ascertained that if character slit 69 associated with upper case character A is aligned with an initial or zero position then character slit 70 associated with the character upper case M is then spaced along the periphery of disc 26 from character slit 69 by an amount equal to 12 (Q/52 + Q). In a like manner character slit 72 associated with lower case character M is spaced from character slit 69 by an amount equal to 38 (Q/52 + Q) and character slit 74 is similarly spaced from character slit 69 by an amount equal to 51 (Q/52 +Q).

Having described the unique relationship between a particular character slit and its respective character space with which it is associated, the function of these character slits in accordance with the present invention will now be described. As noted hereinabove, the various slits referred to, both the character slits and slits 38 on the character disc 26, are transparent areas in the normally opaque surface of the emulsion side of the character disc 26. Therefore, these slits transmit light from an appropriate source of constant illumination which is not shown in the figures but may be a conventional low voltage lamp. The light which is transmitted by these particular slits is detected by a conventional pair of photocells or photodiodes which are located inside the photocell assembly designated by reference numeral 78. One photocell (referred to hereinafter as the clear photocell) exclusively monitors light passing through slit 38 while the other photocell (referred to hereinafter as the character photocell) monitors exclusively light passing through the character slits. As will be seen hereinafter in connection with the description of the logic control circuitry, slit 38 is utilized to generate a signal to reset or clear a character counter which generates a full count when the selected character is in the exposure zone. As can be seen from the depiction of FIG. 3, the photocells are located 120° from the center of the exposure zone or from the center line 30 of the image path. This is done so as to remove the photocells from the exposure zone so that they will not obstruct the light passing therethrough. Placing them 120° from this position is equivalent to their being at this position since three character sets are used on the character disc 26. When, for example, the character photocell detects character slit 70 as shown in FIG. 4, the control logic through the use of a counter, which at this point registers a full count knows that the upper case character M is in the exposure zone. As noted hereinabove, the exposure zone is actually defined by the intersection of the character area 28 of character disc 26 and a portion of one of the spiral segments 36 of the optical field stop disc 32. As shown in FIG. 4 this exposure zone may extend anywhere from the point represented by reference numeral 80 to the point represented by reference numeral 82. This space between these two points along a radian of disc 26 passing through center line 30 of the image path defines the upper and lower limits of the exposure zone.

As will be brought out in the discussion of the logic circuitry, the count of the character slits determines precisely when the flash lamp 50 will be triggered. Since the position of character photocell in assembly 78 is fixed relative to the center line 30 of the image path, the character slit associated with the particular character in the exposure zone which is projected by the light from the flash lamp 50 will always be in the same position relative to center line 30 and coincident therewith. However, because of the unique relationship between a particular character and its respective character slit, the position of the projected character in the exposure zone will vary. For example, when the flash lamp is triggered to project the image of the upper case character A, the character itself will be to the right side as FIGS. 4 and 5 are viewed of its respective character slit and of the exposure zone. In other words, the projected character will be closer to point 80 as shown in FIG. 4 than point 82. In the other extreme, when lower case character Z is projected, it will be to the left, as FIGS. 4 and 5 are viewed, of its respective character slit and closer to side 82 of the exposure zone than side 80 thereof.

The particular function of the character slits is best explained in relation to actual operating parameters within which the apparatus illustrated is capable of operating. An initial factor which is fixed in value is the bit rate possible for transmission over standard voice grade telephone lines, viz., 2,400 bits/second. Typical alphanumeric codes use eight bits/character which dictates a maximum transmission and recording rate of 300 characters/second. Since the character disc carries three character sets and one character per set is projected, the disc must rotate at a rate of 100 revolutions/second in order to achieve the 300 character/second recording rate (three characters/revolution is the maximum recording rate). For typical typewriter spacing, 10 character/linear inch of drum surface is required. If 84 characters are desired per line then the recording zone limited by slit mask 6 is 7 inches. This results in a drive speed for chain 58 of 25 inches/second. At this speed, the chain, and hence the optical units attached thereto, will progress approximately one character space during the time disc 26 moves the equivalent of one character set through the exposure zone. This is realized when it is considered that the chain 58 moves at the rate of 300 character spaces/second while disc 26 moves one character set through the exposure zone in one three-hundredth of a second at the rate of 100 revolutions/second.

With the preceding factors and parameters understood, the problem of uniform spacing of recorded characters can be better appreciated. Since the tangential velocity of a typical 4-inch diameter disc is approximately 1,200 inches/second, one aspect of the spacing problem is overlap in the recording of two characters on the disc occurring very close to one another, e. g., lower case character Z and upper case character A. The amount of time elapsing between the projection of these two characters is so small as to be negligible for practical considerations. However, in spite of this fact, proper spacing of these two characters is accomplished in accordance with the principles of the present invention. Let the center of the exposure zone which corresponds to the center line 30 of FIGS. 1 and 2 and the intersection of disc center lines 84 and 86 in FIGS. 4 and 5 represent a zero position. To the left of this zero position are negative values of distance and to the right thereof positive values. These negative and positive values relate distance of the center of a character space from its associated character slit when that character slit is at the zero position (when the lamp 50 is energized if it is desired to record the character in that character space). Since the position of the character spaces are predetermined relative to their character slits, a table of distance values can be attributed to each character in a character set. With 52 characters per set, values from +25.5 to −25.5 can be given the characters as follows:

| | | | |
|---|---|---|---|
| $A+25.5$ | $N+12.5$ | $a-0.5$ | $n-13.5$ |
| $B+24.5$ | $O+11.5$ | $b-1.5$ | $o-14.5$ |
| $C+23.5$ | $P+10.5$ | $c-2.5$ | $p-15.5$ |
| $D+22.5$ | $Q+9.5$ | $d-3.5$ | $q-16.5$ |
| $E+21.5$ | $R+8.5$ | $e-4.5$ | $r-17.5$ |
| $F+20.5$ | $S+7.5$ | $f-5.5$ | $s-18.5$ |
| $G+19.5$ | $T+6.5$ | $g-6.5$ | $t-19.5$ |
| $H+18.5$ | $U+5.5$ | $h-7.5$ | $u-20.5$ |
| $I+17.5$ | $V+4.5$ | $i-8.5$ | $v-21.5$ |
| $J+16.5$ | $W+3.5$ | $j-9.5$ | $w-22.5$ |
| $K+15.5$ | $X+2.5$ | $k-10.5$ | $x-23.5$ |
| $L+14.5$ | $Y+1.5$ | $l-11.5$ | $y-24.5$ |
| $M+13.5$ | $Z+0.5$ | $m-12.5$ | $z-25.5$ |

These values represent the numerator in a ratio having 52 as the denominator so that the character space is divided into 52 increments. As noted hereinabove, upper case character A has its character slit 69, 0.5/52 of a character space to the right of the left-most edge of its character space. Therefore, the center of this character is 25.5/52 of a character space from its character slit in a direction previously defined as positive. Similarly, the lower case character *z* is given a value of −25.5/52. Therefore, if the sequence of characters is "zA", the distance between these two characters on the drum must be equal to one character space. If it is less than this amount, the recorded characters will overlap; if greater than this amount, the spacing between the recorded characters will be incorrect. This can be expressed by the simple equation:

$$D_A - D_z + d = 1$$

where $D$= distance travelled by the lens-mirror assembly) which translates when using the above table to:

$$(+25.5/52) - (-25.5/52) + d = +51/52 + 1/52 = 52/52 = 1$$

In the sequence such as "Az", it can be demonstrated that there will be only one character space between characters on the drum as follows:

$$D_z - D_A + d = 1$$

Again using the above Table, $D_z = -25.5/52$ and $D_A = +25.5/52$. In this particular sequence one character space is moved by the chain 58 per passage of a character set through the exposure zone. Therefore $d$ will be equal to 52/52 or one character space, as the character set including the aforementioned blank space containing the projected character A passes the exposure zone, plus another amount of 51/52 required to move the second character set through the exposure zone to bring the lower case character *z* thereto. So $d$ will equal (52/52 + 51/52) and the three term equation translates to:

$$-25.5/52) - (+25.5/52) + (52/52 + 51/52) = 1$$

$$(-51/52) + (103/52) = 52/52 = 1$$

This demonstration with the two sequences of characters establishes the effectiveness of the character slits in insuring that the space between the recording of any two characters in the set is substantially uniform regardless of the distance separating their stencils on the character disc.

With the explanation of the character disc and the function of the character slits therein given above, it can be appreciated that since the exposure zone is actually two character spaces wide, something must insure that only one character is projected at a time. As FIGS. 4 and 5 are viewed, it can be seen that two characters are usually in the exposure zone between points 80 and 82 with the exception of the first and last characters of the sets. In order to eliminate the possibility that two characters will be projected, optical field stop disc 32 is employed. Its utilization can best be seen with reference to FIGS. 3, 4 and 5 which show the relationship between the two discs. Disc 32 rotates in a direction as indicated by the arrow and has its rotation synchronized with that of the character disc so that one of the spiral segments 36 passes through the exposure zone coincidentally with the passage therethrough of one of the character sets on disc 26. This is evident from the positions of the discs as depicted in FIG. 4 or 5. While FIGS. 4 and 5 do not show two characters in the exposure zone, it can be pictured when the character disc is advanced so that, for example, upper case characters A and B are in the exposure zone together. In that situation, the optical field stop disc 32 would block character A's projection and permit the projection of character B via transparent segment 36.

Now that the mechanical aspects of the apparatus depicted in FIGS. 1 to 5 has been described, one facet of this apparatus will be explained which lends it the capability of very high speed recording. This capability is partially due to the role played by the moving optical system comprised of the lens-mirror units including lens 46 and mirror 48 attached to the drive chain 58 via members 49 and 56. However, by itself this optical system could not achieve the ultimate speed capability but in cooperation with the collimating optical assembly 42 it is all possible.

The recording zone in a typical recorder may be approximately 7 inches long and is defined by the opening in the slit mask 6 in the direction of the drum's axis. The spacing of the lens-mirror units is such that the distance between the focal paths in the plane of the slit mask of the two units closest to the recording zone is exactly equal to the dimension of the slit mask's opening measured in the direction of the axis of the recording drum 2. In other words, viewing FIG. 2 of the two lens-mirror units intercepting the collimated image projection reflected by mirror 44 the one on the left is focusing whatever character is being projected onto the slit mask and the one on the right is just focusing the same character image through the slit mask's opening and onto the drum surface. In exactly this manner dead time between the recording of adjacent lines of alphanumeric information is eliminated or reduced to such an infinitesimal amount that in practice it is non-existent. Consequently, as the lens-mirror unit on the left completes the recording of one line of information, the unit on the right is just beginning the next line of information. From this explanation it can be appreciated that the spacing of the lens-mirror units on the drive chain is somewhat critical.

It is helpful in the discussion to refer back to the parameters offered to show a practical environment of the recording apparatus. In the example being used, the lines of alphanumeric information recorded have a vertical density of six lines per inch. Therefore the drum must move through the recording zone at approximately 0.625 inches per second.

As noted hereinabove, the spacing of the lens-mirror units alone is not enough to insure this high speed and non-existent dead time between successive line recordings. The collimated character projection is also important. From the above discussion of the precise spacing of these lens-mirror units, it is essential that each lens 46 focuses the same character being projected at that instant of time. This is made possible by utilizing Huygens' theory that the wave front of light emission can at any future time be determined by assuming that every point on a given wave front acts as the center of a new disturbance emanating from from that point. In other words, a new wave front can be found by treating each point of the old wave front as a new source of light from which a secondary wavelet emanates in all directions. Therefore, when the light emitted by flash lamp 50 is collected and translated by the optical arrangement 54, which includes conventional condenser or collector lenses, through the transparent character shaped area in the exposure zone, that wave front so shaped by the transparent area includes a multiplicity of individual light sources corresponding to the points of the character's area. These light sources radiate light in all directions but the collimating assembly 42 acts to collimate it so that many images of the projected character are focused at infinity by this assembly 42. By means of mirror 44 and lenses 46, two of these images are intercepted and focused by the two lens-mirror units as one leaves and one enters the recording zone. In this manner, the projected character image is instantly available to the unit on the right as the next line is being recorded immediately after the preceding line's recording was completed.

Having described the mechanical aspects of the present invention and the function of the character slits, reference will now be made to FIG. 6 which schematically depicts the logic circuitry employed to control the recording process. As noted hereinabove, the apparatus of this invention can be used on the receiving end of a standard voice grade telephone link over which is transmitted coded groups of binary bits representative of information or data, for example alphanumeric data as well as various control words. Such bit groups are received by the circuit of FIG. 6 at an input terminal 3 which serially supplies these bits to the input of a conventional shift register 5 and to a conventional clock bit recovery circuit 7. The latter provides suitable recovered clock pulses to a counter 9 of conventional design which has a full count capacity equal to the number of bits employed to represent a particular alphanumeric character. In the particular example used in this description, eight bits have been referred to as constituting a bit group. Circuit 7 also supplies these recovered clock pulses to the shift input of the shift register 5 which shift the bits of the bit group thereinto. In addition to the shift register 5 and the counter 9, the recovered clock pulses are also provided as an input to gate 11 and detector 13.

As for the detector, these pulses actually serve to enable an input gate in the detector 13 so that the detector can decode certain code words temporarily stored in the shift register 5. Code words such as SYNC and START are decoded by this conventional detector circuit 13 which may be comprised of various gate combinations as is well known in the art. As shown in FIG. 6, the two outputs of the detector 13 are labeled "Start" and "Sync." Each of these outputs will be energized when the proper word is detected as being stored in the shift register 5.

In addition to the parallel output to the detector 13, shift register 5 also has a parallel output to a conventional 8 stage digital register 15 which, in turn, has parallel outputs to another identical register 17 and so on until an eighth such digital register 19 is reached. These registers serve as a very short buffer for the code groups before and during the recording process.

Before the actual receipt of coded information is described, a description of the link between the logic circuit of FIG. 6 and the mechanical side of the recording apparatus will be given. As was described in connection with FIGS. 1, 2, and 3, photocell housing 78 houses two photodetectors referred to as a clear photodetector and a character photodetector which detect the presence of slits 38 and the character slits, respectively, of the character disc 26. These two photocells or photodetectors are coupled to suitable amplifiers 21 and 23, respectively, via input terminals 25 and 27 associated therewith.

The character photocell and amplifier 23 provide a signal each time one of the character slits passes the photocell. This signal constitutes what will be referred to as simply a clock pulse, in distinction to the recovered clock pulse. Such a clock pulse is supplied to many sub-systems of the circuit of FIG. 6. The character counter 29 receives them to index its count. In addition, the flash lamp trigger gate 31 and the register load circuits 33 receive these clock pulses to respond in a particular manner to be described hereinafter.

The clear photocell and amplifier 21 provide a clear signal indicative of each time one of the slits 38 on the character disc passes housing 78. These signals serve many roles, one of which is to clear or reset the character counter 29 to its initial condition, for example, zero. The eight logic gates represented by block 35 are enabled by a delayed clear signal, which permits the complement of the contents of the eighth register 19 to be loaded into the character counter 29. In addition, these clear pulses or signals serve as one input to gate 37 and to set flip-flop 39 for purposes to be described hereinafter.

Figure 6:
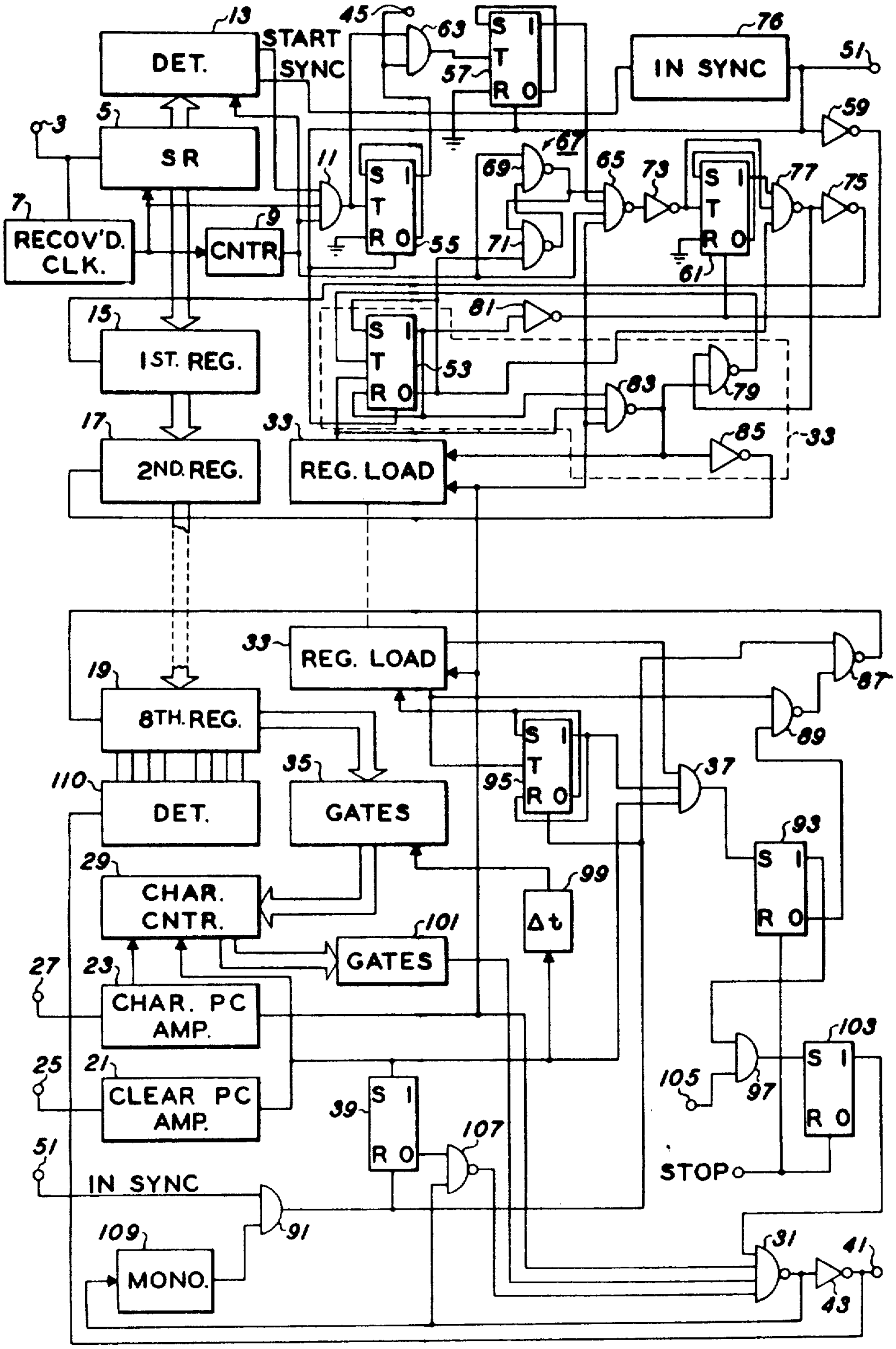
FIG. 6 is a schematic representation of the logic circuit for the apparatus in which the present invention may be utilized.

In continuing this description of the links between the mechanical apparatus and the logic control circuit of FIG. 6, reference must be made to output terminal 41 which, via an inverter 43, couples the output trigger signal generated by trigger gate 31 to the flash lamp 50 previously referred to in connection with the description of FIGS. 1 and 2. Also, mention is appropriate of output terminal 45 which is coupled to suitable control relays initiating particular sub-systems in the xerographic process area such as the pre-exposure corotron and xerographic drum drive thereby preparing the photoreceptor for the recording step as well as other drives for the chain 58 and discs 26 and 32.

In operation, the circuit of FIG. 6 receives sync bit groups first which are shifted into shift register 5, detected by detector 13, and indicated as a pulse to an in sync circuit 76 which may be of any suitable design to monitor a sequence of received sync pulses. An in sync condition is indicated by a signal at terminal 51 which can be coupled to other circuits responding to such a condition. This in sync signal is provided to reset all the flip-flops included in the register load circuits 33 as well as flip-flops 55 and 57. By way of inverter 59 coupled to terminal 51, an inverse signal of opposite polarity to that of the in sync signal is supplied to reset flip-flop 61. Practically, this means that once the recording apparatus reaches an in sync condition, the flip-flops mentioned above as being coupled to terminal 51 are placed in an initial reset condition.

After this in sync condition is reached, a START word is transmitted to the recorder which, like the SYNC words, is shifted into shift register 5 and detected by detector 13. It should be noted that because of the design of the logic controlling the loading of the eight digital or buffer registers, none of the SYNC words are initially translated to these registers from the shift register 5. The same is true for this first START word. However, this first START word does act to enable gate 11 and, upon the trailing edge of the output signal therefrom, places flip-flop 55 in a set condition. This occurs on the trailing edge of one of the recovered clock pulses. However, due to the propagation time inherent in the flip-flop 55 gate 63 remains disabled. As noted before in connection with output terminal 45, this first START word is required when a xerographic recording medium is utilized to permit preparation of the xerographic process stations. In addition, the pulse at output terminal 45 is also used to begin the chain drive which moves the lens-mirror units through the recording zone.

After the first START word, additional SYNC words may be transmitted and then the second START word is sent. This word is decoded by detector 13 and gate 11 is once again enabled. However, since the reset input of flip-flop 55 is wired directly to ground potential, the output of gate 11 has no effect on its set condition in which it remains. But the enabling of gate 11 does now effect the enabling of gate 62 and, upon the trailing edge of the pulse at its output, flip-flop 57 is set. This generates a high level signal at its set output which enables one input of gate 65.

The other inputs to this gate 65 originate from the counter 9, character photocell amplifier 23, and latch 67 consisting of gates 69 and 71. The first two of these inputs can be considered at a high level. As for the latch, its gate 69 monitors two inputs: one from counter 9 and the other from gate 71. This second gate 71 monitors the output of gate 69 and the reset output of flip-flop 53 in the register load circuit 33 which controls the loading of the second buffer register 17. Since flip-flop 53 is initially in a reset condition by action of the in sync signal, it supplies a high level signal to gate 71. The results of these inputs on latch 67 is to provide a high level signal to gate 65 to be translated into a trailing edge by gate 65 and inverter 73 thereby setting flip-flop 61. A high level condition is then created at the output side of inverter 75, the input of which is coupled to the output of gate 77, This high signal is sufficient to enable the loading of the first buffer register 15 with the contents of shift register 5. This would be the first character after the second START word.

Before detailing the action of the register load circuits 33, it may be helpful to briefly describe their function. Once a word is loaded from the shift register 5 into the first buffer register 15, the loaded word then effectively "slides" through the buffer registers until it reaches the last, or eighth register in the example of FIG. 6, or an empty register immediately "upstream" from a loaded or full register. How this is accomplished will now be described. For simplicity and ease of understanding the circuit of FIG. 6, not all of the circuits 33 have been illustrated in the same detail as the first one. It is to be understood that each such circuit associated with the buffer registers (with the exception of register 19) has the same design as the one detailed in FIG. 6 in the dashed block 33.

With the output of gate 77 experiencing a level transition from high to low to high the output of gate 79 goes high and then low providing a trailing edge to the toggle input of flip-flop 53 thereby setting this flip-flop. This trailing edge coincides with the trailing edge of one of the clock pulses supplied to gate 65. With flip-flop 53 set, the output of latch 67 goes low effectively disabling gate 65. Also, via inverter 81 coupled to the set output of flip-flop 53, a resetting pulse is supplied to flip-flop 61.

Gate 83 monitors the clock pulses, the set output of flip-flop 53, and an output from the next circuit 33 "downstream". This output comes from the reset output of the flip-flop included in that particular load register circuit 33. Since that flip-flop would be initially in a reset condition, this is a high level signal. Therefore, with flip-flop 53 in an initially set condition, the output level of gate 83 goes high-low-high and, accordingly, the output level of inverter 85 goes low-high-low providing an enabling pulse to the second buffer register 17 to permit the word to continue its "slide" toward the last of the buffer registers. This same operation continues to let the word go from one buffer register to the next succeeding one until it ends up on the eighth register 19. Meanwhile, with the high-low-high sequence from the output of gate 83 and a high signal from gate 77, the output of gate 79 goes low-high-low providing a resetting edge to the toggle input of flip-flop 53 thereby preparing it for the next received bit group at input terminal 3.

This same preparatory cycle is accomplished in the remaining circuits 33 by the action of gate 83 as conveyed by the output therefrom which is an input to gate 79's counterpart in the next successive downstream circuit 33.

The technique of loading the last or eighth register 19 differs somewhat from that which has been described in connection with the other buffer registers. The loading of this register 19 is controlled in the first instance by gate 87 which has two inputs; from two other gates 89 and 91. When either of these two gates generates a low level signal at its input to gate 87, then a load pulse will be generated by the latter to load register 19.

As seen from FIG. 6, gate 89 monitors an output from the preceding register load circuit 33 which comes from inverter 85's counterpart therein. In addition to this, it monitors the reset output of flip-flop 93. As will be seen hereinafter, this flip-flop is in a reset condition at this time and hence a high level signal is at one of the inputs to gate 89. Since the output of the inverter in the circuit 33 just upstream from the last register goes through the same level changes as was described in connection with inverter 85, that input to gate 89 will experience a low-high-low level transition. During the high level, the output of gate 89 will be low thus providing a high level load pulse at the output of gate 87 effecting the loading of the last register 19.

As the inverter in the last circuit 33 goes through the low-high-low sequence of level changes, a trailing edge is coupled to the toggle input of flip-flop 95 which acts to set this flip-flop. This puts a high level signal on the input of gate 37 coupled to the set output of this flip-flop 95. This gate 37 has two other inputs, one of which comes from the set output of the flip-flop in the last circuit 33. The other input is from the clear photocell amplifier 21.

The role of gate 37 is to indicate to flip-flop 93 when the last two buffer registers are loaded so that the recording process can begin.

This signal from gate 37 is not translated to flip-flop 93 until a character set begins its pass through the exposure zone previously described, i.e., a clear signal is supplied to gate 37 from the clear photocell. At this point flip-flop 93 will be set and a signal will emanate from the set output of this flip-flop and be translated to one input of gate 97. Before following through the explanation of this gate and its other input, reference should be first made to what other events take place at the initiation of the signal.

As noted hereinabove, the clear signal clears the character counter 29 after a predetermined time from which, dictated by delay circuit 99, the complement of register 19 is transferred or loaded into counter 29 via gates 35 enabled by the delayed clear pulse.

The complement of the register 19, when once loaded into the character counter 29, is augmented by one as each character in the particular character set passes through the exposure zone. The code for the characters is so chosen that when the counter reaches its full count, the character represented by the code word in register 19 will be at the exposure zone. For example, if the desired character to be recorded was an upper case character M, then its code or bit group could be 00001101 which would have "slid" into register 19. Upon the generation of the next clear pulse, the complement of this number, 11110010, would be loaded via gates 35 into the character counter 29. As each character in the set passed the character photocell, its respective character slit would be detected and a clock pulse generated which would be supplied to counter 29 to increase its contents by one. Therefore, after 13 character slits were detected and the upper case character M was at the exposure zone, the contents of the counter 29 would be 11111111 or a full count. This condition would be detected by a series of gates represented in FIG. 6 by block 101 and indicated by a full count signal supplied to the trigger gate 31. The other inputs to this gate need be satisfied before the character in the exposure zone would be projected onto the xerographic drum 2 by lamp 50.

One input is from flip-flop 103 which is set upon the coincident occurrence of two events: a signal from flip-flop 93 and a high level signal from input terminal 105. This latter signal can be generated in several ways and is used to insure that the moving optical systems will be in the right position relative to the recording zone when projection begins. Therefore, a microswitch or photocell system can be used to insure that when this signal is generated the chain 58 is in a predetermined position.

Another input to the trigger gate 31 is from the clock pulse source, character photocell amplifier 23.

The final input to this gate comes from the output of gate 107 which monitors the reset upon output of flip-flop 39 and the output of trigger gate 31 itself. The output of trigger gate 31 is normally high and flip-flop 39 is set by the clear pulse from amplifier 21.

Therefore, all inputs to gate 31 are high thereby providing a low level signal at its output which is inverted by inverter 43 and translated to lamp 50 via output terminal 41 as a high level signal. The upper case character M is then projected onto the recording medium.

When the lamp is flashed, a low level pulse disables gate 107 and triggers monostable multivibrator 109 which, in turn, disables gate 91. Since the automatic set and reset inputs of the flip-flops used in FIG. 6 are level sensitive, during the disabled condition of gate 91, flip-flop 39 is reset. In addition, flip-flop 95 is reset. Since the reset output of the flip-flop feeds back to the next preceding register load circuit 33, specifically as one input to gate 83 and the input gate associated with the set input of flip-flop 53 therein, the output of this gate 83 goes low permitting the output of its respective gate 79 to go high providing the penultimate buffer register with a loading pulse. Coincidently with this, the low level pulse from gate 91 also is supplied as one input of gate 87 thereby permitting this gate to supply the last register 19 with a load pulse also so that it can accept the contents of the penultimate register. It may be noted that affirmative loading is used in the stream of buffer registers so that zeros can be loaded from one register to another without first clearing the latter.

Before the above description was started using the upper case character M as an example, the first word was located in the last register. Therefore, suitable detecting gates can be incorporated into detector 110 which monitors the contents of register 19. The detector also detects other control words such as SPACE, STOP, and SYNC. When it detects one of these words, it translates an inhibit signal to output terminal 41 which effectively inhibits the energization of the flash lamp even though all other conditions at the input to gate 31 are satisfied.

The above description of a high speed alphanumeric recording apparatus in accordance with the principles of the present invention fulfills all the desirable requirements of a high speed recorder that meets the standard of typewriter quality and versatility.

While the foregoing description has referred to optically detectable slits in the character disc 26, other detectable indicia may also be used, for example, conductive areas, embossed areas, or any other type of readily detectable marking or index.

While the invention has been described with reference to a preferred embodiment, it will be understood by those skilled in the art that various changes may be made and equivalents may be substituted for elements thereof without departing from the true spirit and scope of the invention.

What is claimed is:

1. An optical system for a recording apparatus employing a light responsive recording medium in a recording zone wherein a light modulating area in an opaque member intercepts light from a projection flash lamp at an exposure zone comprising:

a. optical means for collimating light passing through said area;

b. a drive member;

c. means for driving said drive member at a constant speed through said recording zone and substantially parallel to said recording medium;

d. two lenses each attached to said drive member and positioned at some time during the movement of said drive member relative to said collimated light to intercept simultaneously different portions thereof, said lenses being spaced apart on said drive member by a distance equal to the dimension of said recording zone in the direction of movement of said lenses therethrough;

e. two optical means, each associated respectively with one of said lenses, for directing the light passing through said lenses onto said recording medium, the length of the path travelled by the light passing through any one of said lenses to said recording surface via a respective one of said two optical means substantially equalling the focal length of said lenses.

2. An optical system as defined in claim 1 wherein said two optical means are mirrors, each one of which is fixed relative to a respective one of said lenses.

3. An optical system for recording apparatus employing a light responsive recording medium in a recording zone wherein light modulating patterns in an opaque member intercept light from a projection flash lamp at an exposure zone comprising:

a. collimating means for collimating the light passing through said patterns;

b. two lenses spaced apart by a predetermined distance and positioned relative to said collimating means to simultaneously intercept different portions of said collimated light, one of said lens being in said recording zone;

c. motive means for repeatedly moving said lenses through said recording zone in a predetermined direction;

d. said predetermined distance being equal to the dimension of said recording zone in said predetermined direction; and e. two mirrors, each fixed relative to a respective one of said lenses and aligned therewith to direct said different portions toward said recording medium, the distance from one of said lenses to its respective mirror and from said respective mirror to said recording medium combining to be equal to the focal length of said lens.

* * * * *